United States Patent
Nishikawa

[19]

[11] Patent Number: 6,053,708
[45] Date of Patent: Apr. 25, 2000

[54] WASHER PUMP APPARATUS

[75] Inventor: Makoto Nishikawa, Toyohashi, Japan

[73] Assignee: Asmo Co., Ltd., Japan

[21] Appl. No.: 09/168,152

[22] Filed: Oct. 8, 1998

[30] Foreign Application Priority Data

Oct. 16, 1997 [JP] Japan .................................. 9-283972

[51] Int. Cl.[7] .................................................. F04B 17/03
[52] U.S. Cl. ...................... 417/360; 417/363; 417/423.15
[58] Field of Search .................................. 417/360, 363, 417/423.15

[56] References Cited

U.S. PATENT DOCUMENTS

| | | | |
|---|---|---|---|
| 3,982,856 | 9/1976 | Hehl | 417/360 |
| 4,181,472 | 1/1980 | Sharp | 417/363 |
| 5,181,838 | 1/1993 | Sato et al. | 417/360 |
| 5,184,946 | 2/1993 | Sato | 417/360 |
| 5,480,289 | 1/1996 | Lee | 417/360 |
| 5,531,573 | 7/1996 | Nokubo | 417/360 |

FOREIGN PATENT DOCUMENTS

5-50964  7/1993  Japan .

*Primary Examiner*—Erick R. Solis
*Attorney, Agent, or Firm*—Parkhurst & Wendel, L.L.P.

[57] ABSTRACT

A washer pump apparatus is provided which has a simple structure and a small number of parts, which can be manufactured easily and at a low-cost, and in which a breathing hole, which communicates an interior of a motor portion of a washer pump with the atmosphere, is made sufficiently waterproof. In the washer pump apparatus, an inlet of the washer pump is mounted to a washer tank via a grommet. A vent groove, which communicates with the breathing hole of the motor portion, is formed at the grommet, and a vent hole is formed between the vent groove and the washer tank. Accordingly, satisfactory waterproofing is ensured, and the interior of the motor portion is open to the atmosphere. Because of a simple structure of forming the vent hole at the grommet, another part such as a waterproofing cover or the like is not needed, and a number of parts used does not increase. The washer pump apparatus can be manufactured easily and inexpensively.

18 Claims, 12 Drawing Sheets

WASHER PUMP APPARATUS

BACKGROUND OF THE INVENTION

1. Field of the Invention

The present invention relates to a washer pump apparatus, and more particularly to a washer pump apparatus in which a washer pump is fixed to a tank via a grommet.

2. Description of the Related Art

A washer pump for discharging a window washer liquid or a headlight washer liquid in a vehicle or the like comprises a motor portion and a pump portion which is driven by this motor portion. An inlet of the pump portion is connected to a washer tank via a grommet, and washer liquid in the washer tank is sucked in from the inlet due to the operation of the pump portion and is discharged from an outlet.

The motor portion of such a washer pump is generally structured by a rotor or a stator which is disposed at the internal portion of a cylindrical main body (a yoke housing). However, in a case in which the atmospheric temperature changes due to heat generated by the motor itself and the internal pressure of the motor portion changes, for example, in a case in which the internal pressure of the motor portion is in a state of negative pressure with respect to the atmospheric pressure, there is the possibility that water or dust may penetrate in through fine gaps or the like of the motor portion. Accordingly, there is a need to solve this drawback. In particular, in a washer pump for a vehicle or the like, although a sealing member is provided between the motor portion and the pump portion (i.e., pump room) and the motor portion is kept in an airtight state, when the interior of the motor portion is in a state of negative pressure, there is higher possibility that water may be sucked in from this sealed portion. Accordingly, it is essential to solve this drawback.

For this reason, conventionally, a so-called breathing hole which communicates the inside of the motor portion with the outside (the atmosphere) has been provided. Accordingly, even when heat is generated by the motor or the atmospheric temperature changes, the internal pressure of the motor portion is maintained the same as the atmospheric pressure (the relative difference in an air pressure between the inside and the outside of the motor portion 12A can be eliminated) so as to prevent water or dust from being sucked in.

For example, in a washer pump for a vehicle or the like such as that as described above, the washer pump often tends to be disposed at a position where there is a higher possibility that water will splash from the outside. Accordingly, when a simple breathing hole which communicates the motor portion with the outside is used, water enters in through this breathing hole, which is not preferable. For this reason, conventionally, there have been proposed structures in which it is difficult for water or the like to enter into the motor portion through a breathing hole. Examples of structures include a structure in which a breathing hole is formed in a labyrinthine shape (e.g., Japanese Utility Model Application Laid-Open (JP-U) No. 58-111400); a structure in which a waterproofing cover is provided at a breathing hole (opening) (e.g., Japanese Utility Model Application Laid-Open (JP-U) No. 5-50964); and a structure in which a breather pipe is connected to a breathing hole (opening) and one end of the pipe is located at a position where it is difficult for water or the like to splash (e.g., Japanese Utility Model Application Laid-Open (JP-U) No. 56-141550).

In the aforementioned structures in which the breathing hole is formed in a labyrinthine shape or a waterproofing cover or breather pipe is connected to the breathing hole, the interior of the motor portion can be left open to the atmosphere and the internal pressure of the motor portion can be made the same as the atmospheric pressure. Further, even if the motor portion is located at a position onto which it is easy for water or the like to splash, it is difficult for water or the like to enter into the motor portion through the breathing hole. As a result, it is possible to increase the degrees of freedom in selecting the position at which the motor portion is to be disposed.

With the aforementioned structures which are formed merely by breathing holes, the internal pressure of the motor portion can be made the same as the atmospheric pressure, and it is more difficult for water to enter in through the breathing hole. However, when the labyrinthine breathing hole is used, because the breathing hole is formed in a labyrinthine shape, the configurations of the component parts for forming the breathing hole are extremely complicated. For this reason, it becomes difficult to manufacture the washer pump apparatus, the manufacturing cost thereof is high, and the entire size of the apparatus is large. Further, in a case in which another component such as a waterproofing cover or a breather pipe is used, since another part such as the waterproofing cover or the breather pipe is newly needed, the number of component parts used thereby increases. Thus, in any of the above-described cases, there are drawbacks, and it has been desired to overcome these drawbacks.

SUMMARY OF THE INVENTION

In view of the aforementioned, it is an object of the present invention to provide a washer pump apparatus in which, regardless of the posture or position at which the apparatus is mounted to a vehicle or the like, a breathing hole, which communicates an interior of a motor portion with the atmosphere, is sufficiently waterproof, and the washer pump apparatus can be realized with a simple structure, without an increase in the number of parts, and by easy and inexpensive manufacture.

In accordance with a first aspect of the present invention, there is provided a washer pump apparatus having a washer pump which comprises a motor portion and a pump portion which is driven by the motor portion, the washer pump being mounted to a tank via a grommet, wherein the washer pump includes a vent hole which is formed in a state in which the washer pump is fixed to the tank and which communicates with a breathing hole of the motor portion, and an interior of the motor portion is open to the atmosphere via the breathing hole and the vent hole.

In the washer pump apparatus according to the first aspect of the present invention, in a state in which the washer pump which comprises the motor portion and the pump portion is fixed to the tank via the grommet, the vent hole which is provided at the grommet communicates with the breathing hole of the motor portion, and the interior of the motor portion is open to the atmosphere via the breathing hole and the vent hole.

Accordingly, even when heat is generated by the motor itself and the atmospheric temperature thereby changes, the internal pressure of the motor portion becomes the same as the atmospheric pressure (difference in the air pressure between the inside and the outside of the motor portion is eliminated) so that water or dust can be prevented from being sucked in through fine gaps or the like of the motor portion.

Because of the simple structure of merely forming the vent hole in the grommet, manufacture is easy and low-cost.

Conventionally, in order to form the breathing hole of the motor portion in a labyrinthine shape, the configurations of the component parts used for forming the breathing hole are extremely complicated, and manufacture is difficult and expensive. Further, in the present invention, since another part such as a waterproofing cover or a breather pipe is not needed, and the number of parts used does not increase. As a result, the number of processes for the assembly work does not increase.

In accordance with a second aspect of the present invention, there is provided a washer pump apparatus according to the first aspect of the present invention, an opening of the vent hole, which opening is open to the atmosphere, is formed between the grommet and the tank.

In the washer pump apparatus according to the second aspect of the present invention, because the opening of the vent hole provided at the grommet which opening is open to the atmosphere, is formed between the grommet and the tank, the structure of the grommet for forming the vent hole is simple, and thus, manufacture is easy and inexpensive. Further, another part such as a water proofing cover or a breather pipe is not needed, and the number of parts used does not increase.

In accordance with a third aspect of the present invention, there is provided a washer pump apparatus according to the first aspect of the present invention, wherein an opening of the vent hole, which opening is open to the atmosphere, is formed between the grommet and a case flange of the washer pump.

In the washer pump apparatus according to the third aspect of the present invention, because the opening of the vent hole provided at the grommet, which opening is open to the atmosphere, is formed between the grommet and the case flange of the motor portion or the pump portion, because the structure of the grommet for forming the vent hole is simple, manufacture is easy and inexpensive. Further, since it is not necessary to use another part such as a waterproofing cover or a breather pipe, the number of parts used does not increase.

In accordance with a fourth aspect of the present invention, there is provided a washer pump apparatus according to the first aspect of the present invention, wherein an opening of the vent hole, which opening is open to the atmosphere, is formed at the grommet.

In the washer pump apparatus according to the fourth aspect of the present invention, since the opening of the vent hole provided at the grommet, which opening is open to the atmosphere is formed at the grommet itself, the structure of the grommet for forming the vent hole is simple, and manufacture is easy and inexpensive. Further, another part such as a water proofing cover or a breather pipe is not needed, and the number of parts used does not increase.

DESCRIPTION OF THE PREFERRED EMBODIMENTS

Figure 1:
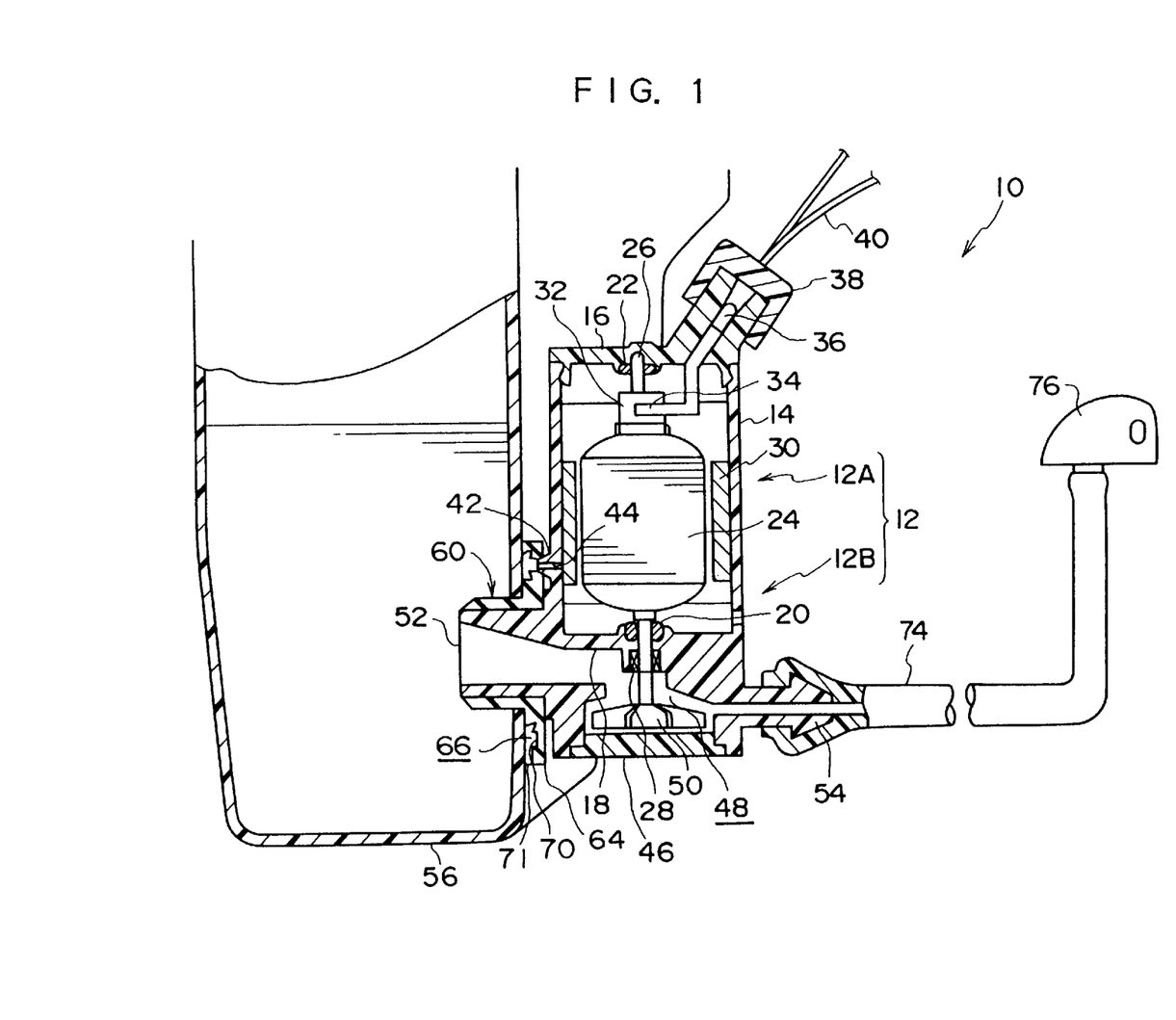
FIG. 1 is a cross sectional view which illustrates an overall structure of a washer pump apparatus according to a first embodiment of the present invention.

A cross sectional view of an overall structure of a washer pump apparatus 10 according to a first embodiment of the present invention is shown in FIG. 1.

The washer pump apparatus 10 is used for discharging, for example, a window washer liquid of a vehicle or the like, and comprises a washer pump 12 and a grommet 60 which will be described later.

The washer pump 12 comprises a motor portion 12A and a pump portion 12B which are formed integrally with each other. A housing 14 is made from a resin and formed in a substantially cylindrical shape, and accommodates therein the motor portion 12A and the pump portion 12B. A resin end housing 16 is fixed to an opening portion at one end of the housing 14 such that the interior of the housing 14 is kept airtight.

The intermediate portion of the housing 14 at the opposite side of the end housing 16 (i.e., a border portion between the motor portion 12A and the pump portion 12B) is separated by a partition wall 18. A bearing 20 is disposed at the central portion of the partition wall 18. A shaft 26 of an armature 24 is supported by this bearing 20 and a bearing 22 in the end housing 16, and the armature 24 is accommodated in the housing 14. Further, a rubber seal 28 is disposed between the partition wall 18 and the shaft 26 at the pump portion 12B side of the bearing 20. Accordingly, airtightness between the pump portion 12B and the motor portion 12A can be ensured.

A magnet 30 is secured to the inner peripheral wall of the housing 14 so as to oppose the armature 24.

A brush 34 corresponding to a commutator 32 of the armature 24 is held at the end housing 16 and press-contacts with the commutator 32. The brush 34 is connected to a connector portion 36. The connector portion 36 is formed integrally with the end housing 16 so as to protrude therefrom in a state in which the connector portion 36 is exposed to the outside substantially from a corner portion of the end housing 16, and is connected to an external connector 38. The external connector 38 is formed so as to correspond to the connector portion 36. The external connector 38 is fitted with the connector portion 36 so that they are integrally connected to each other. A connecting line 40 is connected to the external connector 38, and the other end portion of the connecting line 40 is connected to an electric circuit portion of a vehicle (not shown).

At the motor portion 12A of the washer pump 12, a protruding piece 42 is formed so as to protrude therefrom. A breathing hole 44 is formed in this protruding piece 42. The breathing hole 44 communicates with the interior of the motor portion 12A. Accordingly, the interior of the motor portion 12A is open to the atmosphere via the breathing hole 44.

On the other hand, at the pump portion 12B of the washer pump 12, a pump room 48 is formed by the housing 14 and a bottom wall 46. Further, the tip end of the shaft 26 of the armature 24 extends into the pump room 48. An impeller 50 with a plurality of blades formed thereon in a radial direction is attached to the tip end of the shaft 26, and rotates with the shaft 26 in the pump room 48. Further, an inlet 52 and an outlet 54 are formed in the housing 14, and communicates with the pump room 48. Namely, the pump portion 12B forms a so-called centrifugal pump, and liquid which is sucked in from the inlet 52 can be fed under pressure from the outlet 54 due to the rotation of the impeller 50.

The washer pump 12 which is structured as described above is mounted to a washer tank 56 via a grommet 60. The washer tank 56 is disposed close to a tire wheel house of the vehicle.

Figure 2:
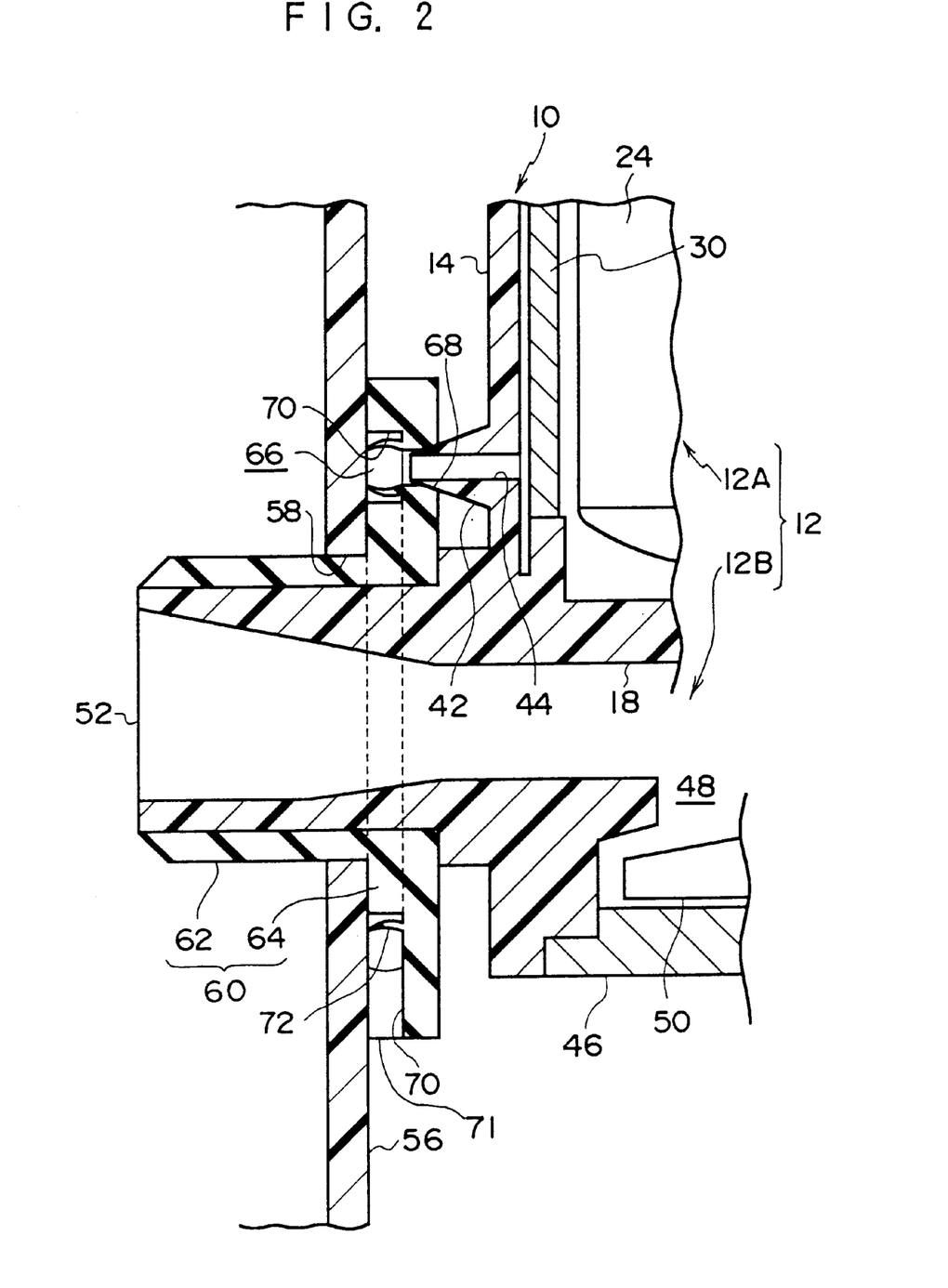
FIG. 2 is an enlarged cross sectional view which illustrates the details of a grommet and a vent hole which are applied to the washer pump apparatus according to the first embodiment of the present invention.

As shown in more detail in FIG. 2, the grommet 60 is formed by a cylindrical insert portion 62 and a collar portion 64 which is formed integrally with the insert portion 62 at one end thereof. The insert portion 62 of the grommet 60 is fit into a mounting hole 58 of the washer tank 56, and the inlet 52 of the washer pump 12 is also fit into the mounting hole 58 (i.e., the grommet 60 is interposed between the mounting hole 58 and the inlet 52), whereby the peripheral portion of the inlet 52 is sealed.

Figure 3:
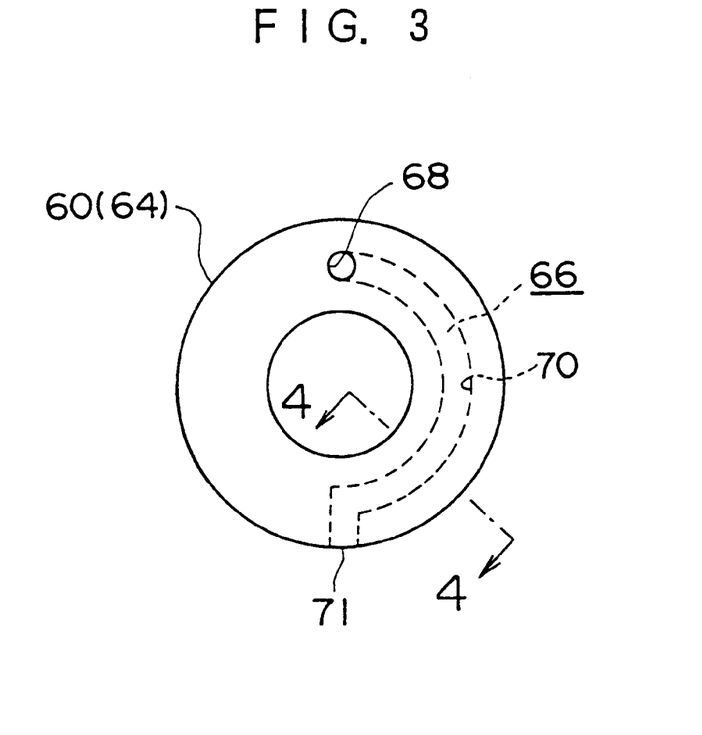
FIG. 3 is a front view of a grommet illustrating the details of the vent hole of the grommet which is applied to the washer pump apparatus according to the first embodiment of the present invention.

A vent hole 66 is formed in the collar portion 64 of the grommet 60. One end of the vent hole 66 is open to the opposite side (i.e., the housing 14 side of the pump portion 12B) of the insert portion 62 of the grommet 60 (i.e., the washer tank 56) and forms a joining opening 68. The protruding piece 42 formed at the housing 14 is fit into the joining opening 68. Further, the joining opening 68 reaches (passes through) the rear surface side of the collar portion 64 (i.e., the washer tank 56 side). Moreover, as shown in FIG. 3, a vent groove 70 continuously extends from the joining opening 68 and is formed over a halfcircle of the collar portion 64. One end of the vent groove 70 is extended to a peripheral edge of the collar portion 64 so as to form an opening 71. Accordingly, in a state in which the grommet 60 is assembled with the mounting hole 58 of the washer tank 56, the vent hole 66, which is formed to be continuous with the joining opening 68, is formed between the collar portion 64 (the vent groove 70) and the washer tank 56. For this reason, as described above, in the state in which the washer pump 12 is fixed to the washer tank 56, the interior of the motor portion 12A is open to the atmosphere via the breathing hole 44 and the vent hole 66.

Figure 4:
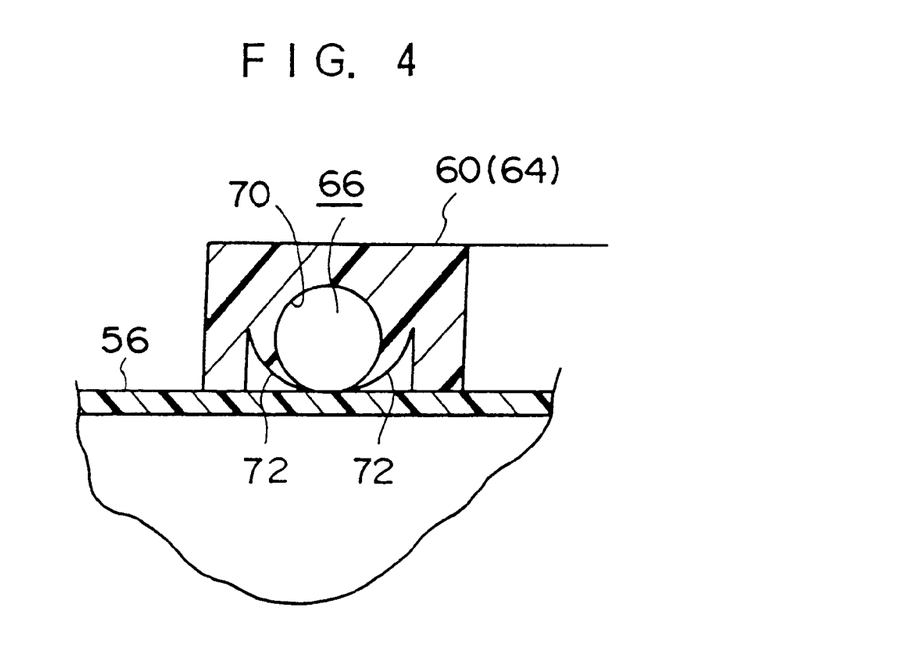
FIG. 4 is a cross sectional view of the grommet taken along line 4—4 of FIG. 3 and illustrates the details of the vent hole of the grommet which is applied to the washer pump apparatus according to the first embodiment of the present invention.

As shown in more detail in FIG. 4, pleat portion 72 (a pair of protruding portion) are formed at the vent groove 70 for forming the vent hole 66. In a state in which the washer pump 12 is mounted to the washer tank 56, the pleat portions 72 closely contact with the washer tank 56. As a result, the sealability of the vent hole 66 is ensured.

The outlet 54 of the washer pump 12 (the pump portion 12B), which is mounted to the washer tank 56 via the grommet 60, is connected to a spray nozzle 76 via a pipe 74. Therefore, during the operation of the washer pump 12, washer liquid within the washer tank 56 is sucked in from the inlet 52, fed from the outlet 54, and jetted from the spray nozzle 76.

Next, operation of the first embodiment of the present invention will be explained.

In the washer pump apparatus 10 having the above-described structure, in a state in which the washer pump 12 which comprises the motor portion 12A and the pump portion 12B is fixed to the washer tank 56 via the grommet 60, the vent hole 66 which is formed in continuous with the joining opening 68 is formed between the collar portion 64 (the vent groove 70) and the washer tank 56. In this state, the vent hole 66 which is provided at the grommet 60 communicates with the breathing hole 44 in the motor portion 12A, and the inside of the motor portion 12A is open to the atmosphere via the breathing hole 44 and the vent hole 66.

Accordingly, even if the atmospheric temperature changes due to heat generation by the washer pump 12 (the motor portion 12A) itself, the internal pressure of the motor portion 12A becomes the same as the atmospheric pressure (the relative difference between the air pressures of the interior and the exterior of the motor portion 12A is eliminated) so that it is possible to prevent water or dust from being sucked in through fine gaps or the like at the washer pump 12. In particular, an excellent effect can be obtained in that water or the like can be reliably prevented from being sucked in from a portion of the seal 28 which is provided between the motor portion 12A and the pump portion 12B.

In the present invention, because of the simple structure of merely forming the vent hole 66 in the grommet 60, manufacture is easy and low-cost. Conventionally, in order to form the breathing hole 44 of the motor portion 12A in a labyrinthine shape, the configurations of the component parts used for forming the breathing hole 44 are extremely complicated, and manufacture is difficult and expensive. Further, in the present invention, since another part such as a water proofing cover or a breather pipe is not needed, the number of parts used does not increase. As a result, the number of processes for the assembly work can be reduced.

In the first embodiment of the present invention, the washer pump apparatus 10 is provided at the washer tank 56 which is located right near a tire wheel house onto which an extremely large amount of water or the like splashes. When a conventional washer pump apparatus has been provided at the washer tank 56 located right near a tire wheel house, it has been necessary to form the vent hole 66 with a complicated structure (configuration). In contrast, in the washer pump apparatus 10 according to the first embodiment of the present invention, if the opening 71 of the vent hole 66 (the vent groove 70), which opens at a peripheral edge of the collar portion 64 of the grommet 60, is positioned, for example, so as to be directed toward a side onto which water or the like does not splash, entry of water or the like into the vent hole 66 can be prevented effectively and the waterproofing of the vent hole 66 can be ensured even if the washer pump apparatus 10 is provided at the washer tank 56 which is provided right near a tire wheel house onto which a large amount of water or the like splashes. As a result, the washer pump apparatus 10 has a simple structure and is inexpensive, and the degrees of freedom in selecting the mounting posture and the mounting position of the washer pump apparatus 10 increase greatly.

In this way, in the washer pump apparatus 10 according to the first embodiment of the present invention, even when the atmospheric temperature changes due to heat generated by the motor portion itself, the inside of the motor portion 12A is open to the atmosphere, and the difference in pressures between the inside and the outside of the motor portion 12A can be eliminated. Further, regardless of the mounting posture or position of the washer pump apparatus 10 to the vehicle or the like, satisfactory waterproofing of the vent hole 66 can be ensured. This can be realized by an extremely simple structure which is such that the washer pump apparatus 10 can be manufactured easily and inexpensively without an increase in the number of parts used.

Figure 5:
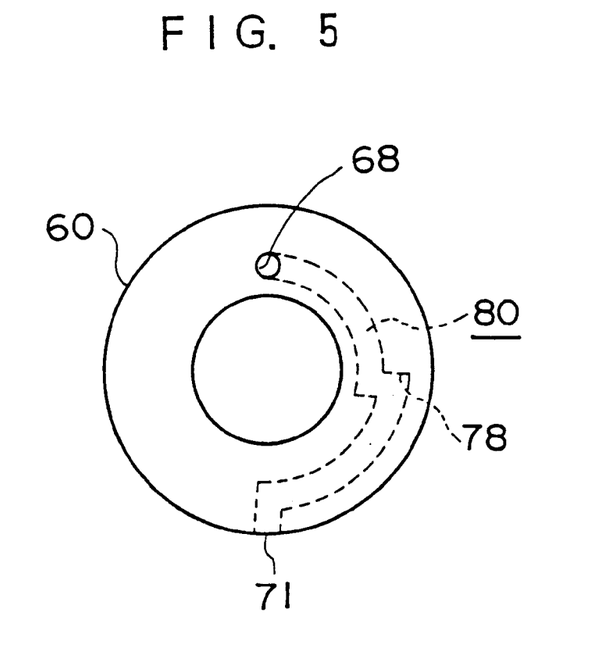
FIG. 5 is a front view, corresponding to FIG. 3, of a grommet, and illustrates another example of a vent hole of the grommet which is applied to the washer pump apparatus according to the first embodiment of the present invention.

In addition, in the first embodiment of the present invention, the vent groove 70 for forming the vent hole 66 is structured such that it is formed so as to extend over a half-circle of the collar portion 64. However, the vent groove may be formed as a vent groove 78, which is illustrated in FIG. 5 and is formed in a crank shape along the path thereof, so as to form a vent hole 80 in a so-called labyrinthine shape. In this case, entry of water from the outside can be prevented even more reliably.

Figure 6:
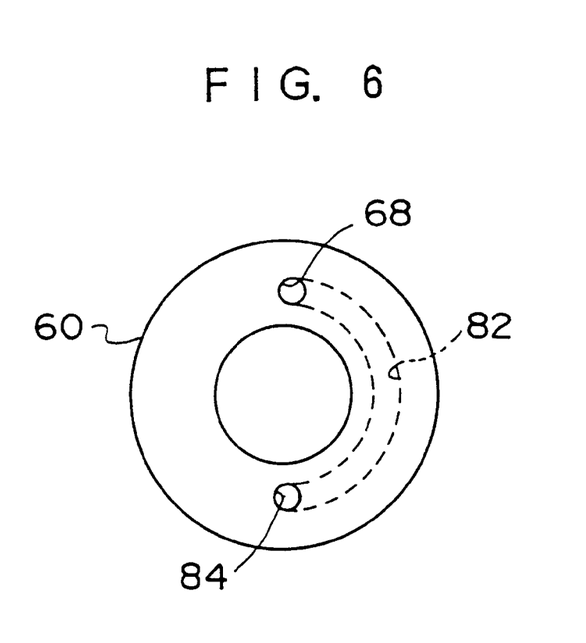
FIG. 6 is a front view, corresponding to FIG. 3, of a grommet, and illustrates another example of a vent hole of the grommet which is applied to the washer pump apparatus according to the first embodiment of the present invention.

Further, in the first embodiment of the present invention, an end portion of the vent groove 70, which continues to the joining opening 68 and is formed on the collar portion 64, extends to the lower end peripheral edge of the collar portion 64 so as to form the opening 71. However, the present invention is not limited to the same. As shown in FIG. 6, an opening 84 of a vent groove 82 can be formed to be open at the same side as the joining opening 68, and the opening 84 can be disposed at an arbitrary position.

Figure 7:
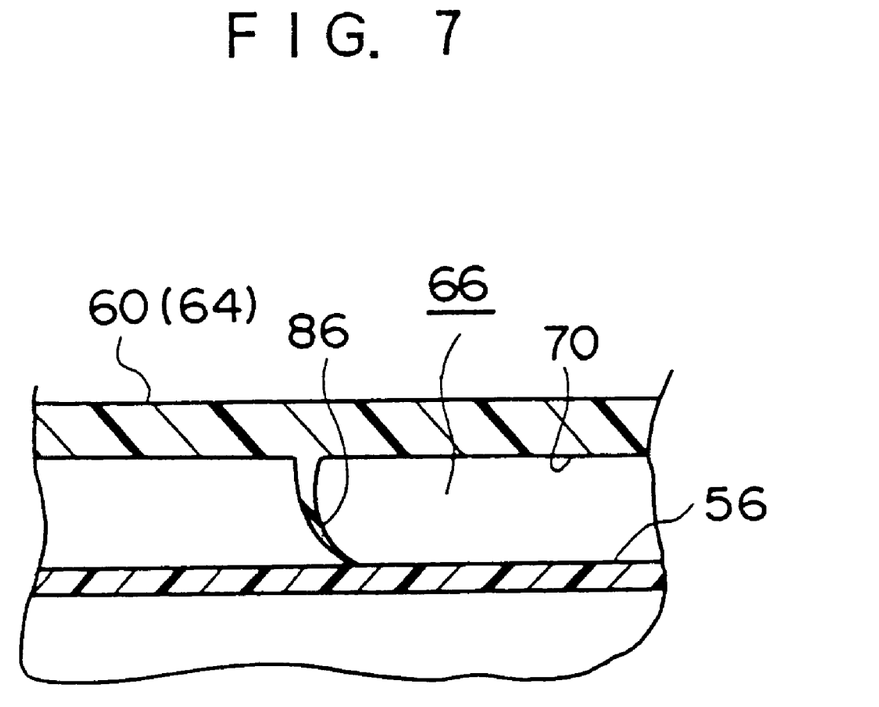
FIG. 7 is a front view of the grommet, and illustrates a valve body which is provided at the vent hole of the grommet which is applied to the washer pump apparatus according to the first embodiment of the present invention.

As shown in FIG. 7, a valve body 86 can be provided in the vent groove 70 for forming a vent hole 66. In this case, the entry of water from the outside can be prevented much more reliably.

Next, operation of a second embodiment of the present invention will be explained.

Portions basically identical to those in the first embodiment are denoted by the same reference numerals as in the first embodiment and description thereof will be omitted.

Figure 8A:
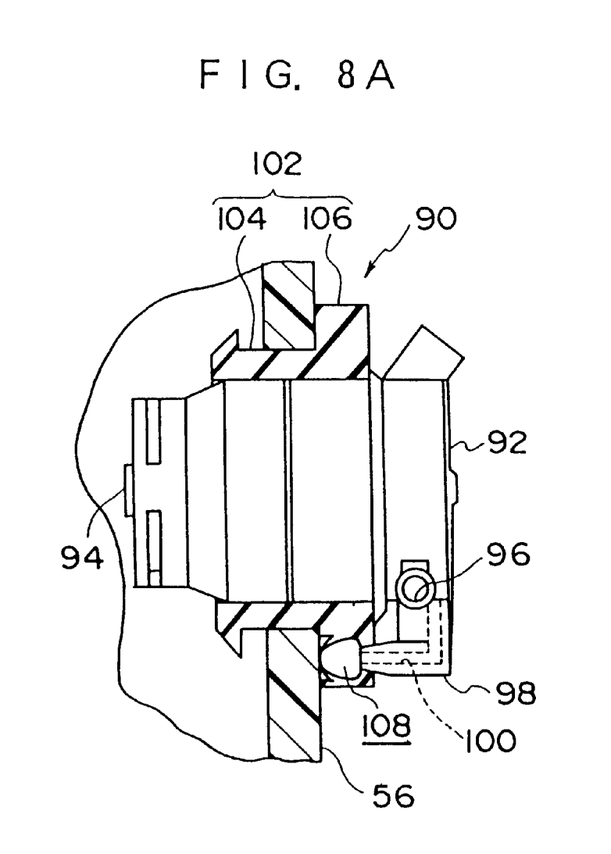
FIG. 8A is a cross sectional view of the structure of a washer pump apparatus according to a second embodiment of the present invention.
Figure 8B:
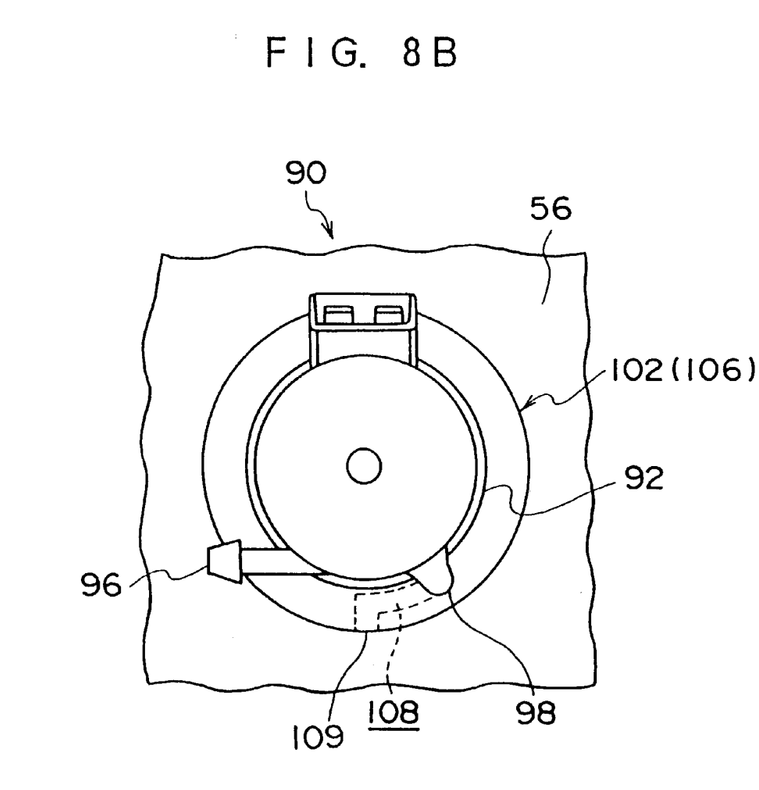
FIG. 8B is a front view of the structure of the washer pump apparatus according to the second embodiment of the present invention.

In FIG. 8A, a cross sectional view of a washer pump apparatus 90 according to a second embodiment of the present invention is shown. In FIG. 8B, a front view of the washer pump apparatus 90 is shown.

The washer pump apparatus 90 comprises a washer pump 92 and a grommet 102.

In the washer pump 92, an inlet 94 is formed integrally with a main body portion of the washer pump 92. The main body portion is directly fit into and fixed to the washer tank 56 via the grommet 102. Accordingly, a liquid is sucked in from the inlet 94, and is fed out under pressure from an outlet 96.

An arm portion 98 is formed so as to protrude from the washer pump 92. A breathing hole 100 is formed in this arm portion 98. The breathing hole 100 communicates with the inside of the washer pump 92 so that the inside of the washer pump 92 is open to the atmosphere via the breathing hole 100.

In the same manner as the grommet 60 according to the first embodiment of the present invention, the grommet 102 is formed by an insert portion 104 and a collar portion 106. Further, a vent hole 108 which is similar to the above-described vent hole 66 is formed in the collar portion 106. The vent hole 108 is formed along the collar portion 106, and one end of the vent hole 108 extends to the peripheral edge of the collar portion 106 and thereby forms an opening 109. The arm portion 98 of the washer pump 92 is fit into the vent hole 108. Accordingly, in a state in which the washer pump 92, together with the grommet 102, is assembled with the washer tank 56, the interior of the washer pump 92 is open to the atmosphere via the breathing hole 100 and the vent hole 108.

In the above-described washer pump apparatus 90, in a state in which the washer pump 92 is fixed to the washer tank 56 via the grommet 102, the inside of the washer pump 92 is open to the atmosphere via the breathing hole 100 and the vent hole 108.

Therefore, even if the atmospheric temperature changes due to the generation of heat by the washer pump 92 itself, the internal pressure of the washer pump 92 is the same as the atmospheric pressure, so that water or dust is prevented from being sucked in through fine gaps or the like of the washer pump 92.

Because of the simple structure of merely forming the vent hole 108 in the grommet 102, manufacture is easy and low-cost. Further, another part such as a waterproofing cover, a breather pipe or the like is not needed, and thus the number of parts used does not increase. For this reason, the number of processes for the assembly work is reduced.

Figure 9:
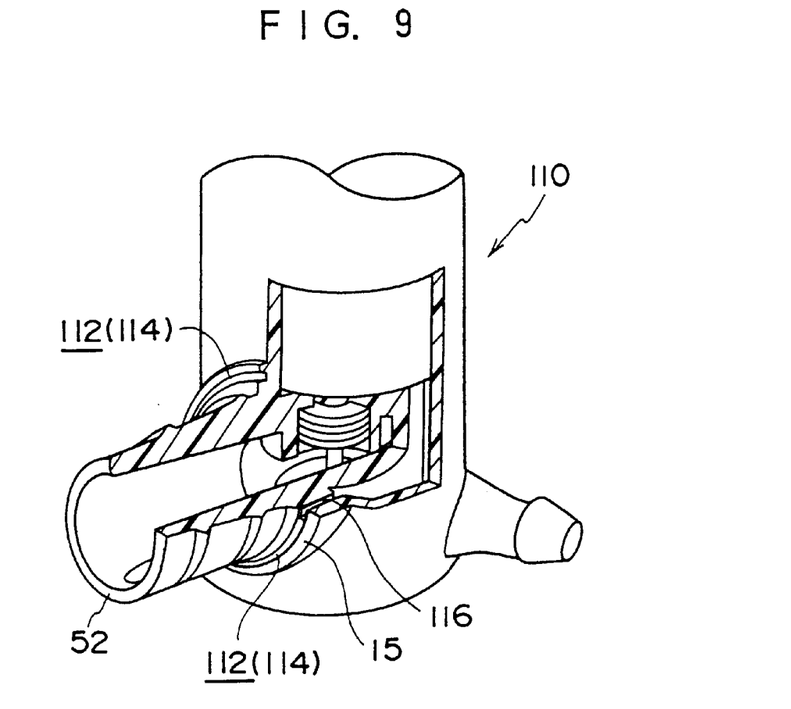
FIG. 9 is a partially broken perspective view of the structure of a washer pump according to a third embodiment of the present invention.

A partially broken perspective view of a washer pump 110 according to a third embodiment of the present invention is shown in FIG. 9.

The washer pump 110 is structured basically in the same manner as the washer pump apparatus 10 according to the first embodiment of the present invention. Namely, the inlet 52 which is formed at the housing 14 is mounted to the washer tank 56 via a grommet (not shown) which is similar to the grommet 60. Moreover, in the third embodiment of the present invention, the facing portion of the grommet, which faces the flange portion 15 at the periphery of the inlet 52, is formed by a flat surface.

Figure 10:
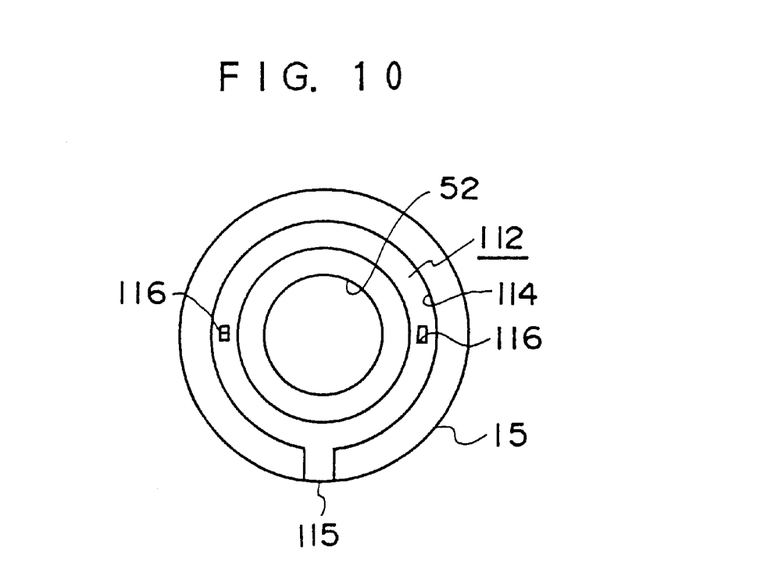
FIG. 10 is a front view of a flange portion of the washer pump, and illustrates the structure of a vent groove (vent hole) of the washer pump according to the third embodiment of the present invention.

A vent hole 112 is formed at the flange portion 15 at the periphery of the inlet 52. As shown in FIG. 10, the vent hole 112 includes a vent groove 114 which is formed so as to extend along the entire periphery of the flange portion 15 in a vicinity of the periphery of the flange portion 15. A portion of the vent groove 114 extends to the lower end peripheral edge of the flange portion 15 and forms an opening 115. Further, the vent groove 114 communicates with a pair of breathing holes 116 provided at the washer pump 110.

In a state in which the washer pump 110 is mounted to the washer tank 56 via a grommet, the vent hole 112, which communicates with the breathing holes 116, is formed between the flange portion 15 of the washer pump 110 and the grommet. For this reason, as described above, in a state in which the washer pump 110 is mounted to the washer tank 56, the interior of the washer pump 110 is open to the atmosphere via the breathing holes 116 and the vent hole 112.

In the washer pump 110 having the above-described structure, even if the atmospheric temperature changes due to heat generated by the washer pump 110 itself, the internal pressure is the same as the atmospheric pressure, and water or dust can be prevented from being sucked in through fine gaps or the like of the washer pump 110.

Since the vent hole 112 is simply provided on the grommet-facing surface of the flange portion 15, manufacture is easy and inexpensive. Further, another part such as a waterproofing cover, a breather pipe or the like is not needed, and thus, the number of parts used does not increase. As a result, the number of processes for the assembly work can be reduced.

Figure 11:
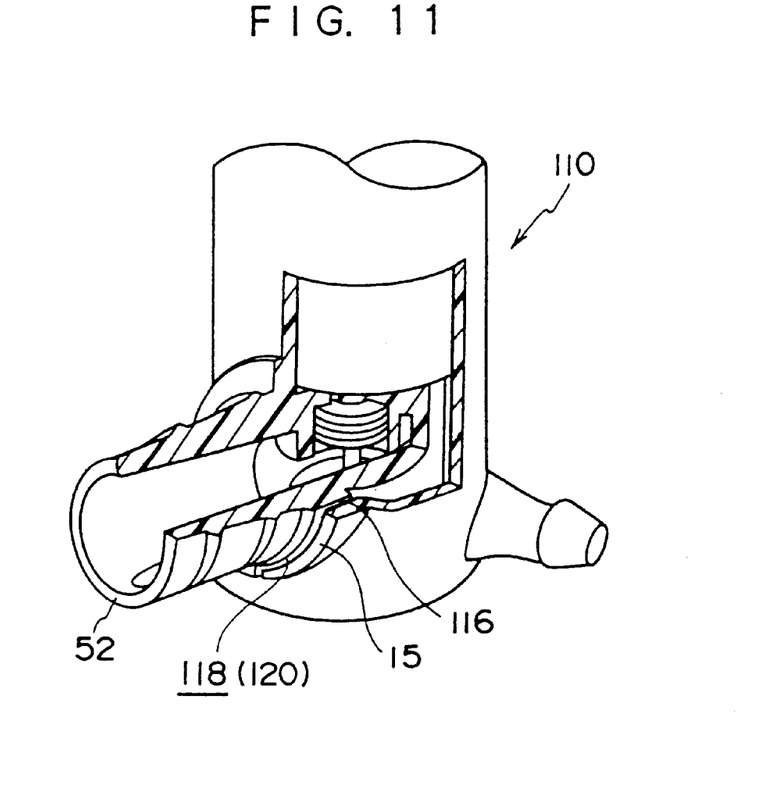
FIG. 11 is a partially broken perspective view corresponding to FIG. 9, and illustrates a variant example of the washer pump according to the third embodiment of the present invention.
Figure 12:
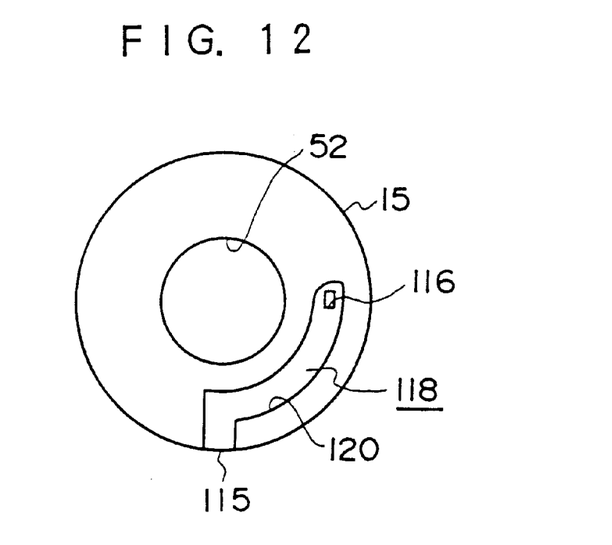
FIG. 12 is a front view of a flange portion of the washer pump shown in FIG. 11, and illustrates the structure of a vent groove (vent hole) of the washer pump.

In the third embodiment of the present invention, the vent hole 112 (i.e., the vent groove 114 for forming this vent hole 112) is formed so as to extend along the entire periphery of the flange portion 15 in a vicinity of the periphery of the flange portion 15 around the inlet 52. However, the present invention is not limited to the same. As shown in FIGS. 11 and 12, a vent hole 118 (i.e., a vent groove 120 for forming this vent hole 118) can be formed at a portion of the periphery of the flange portion 15.

Figure 13:
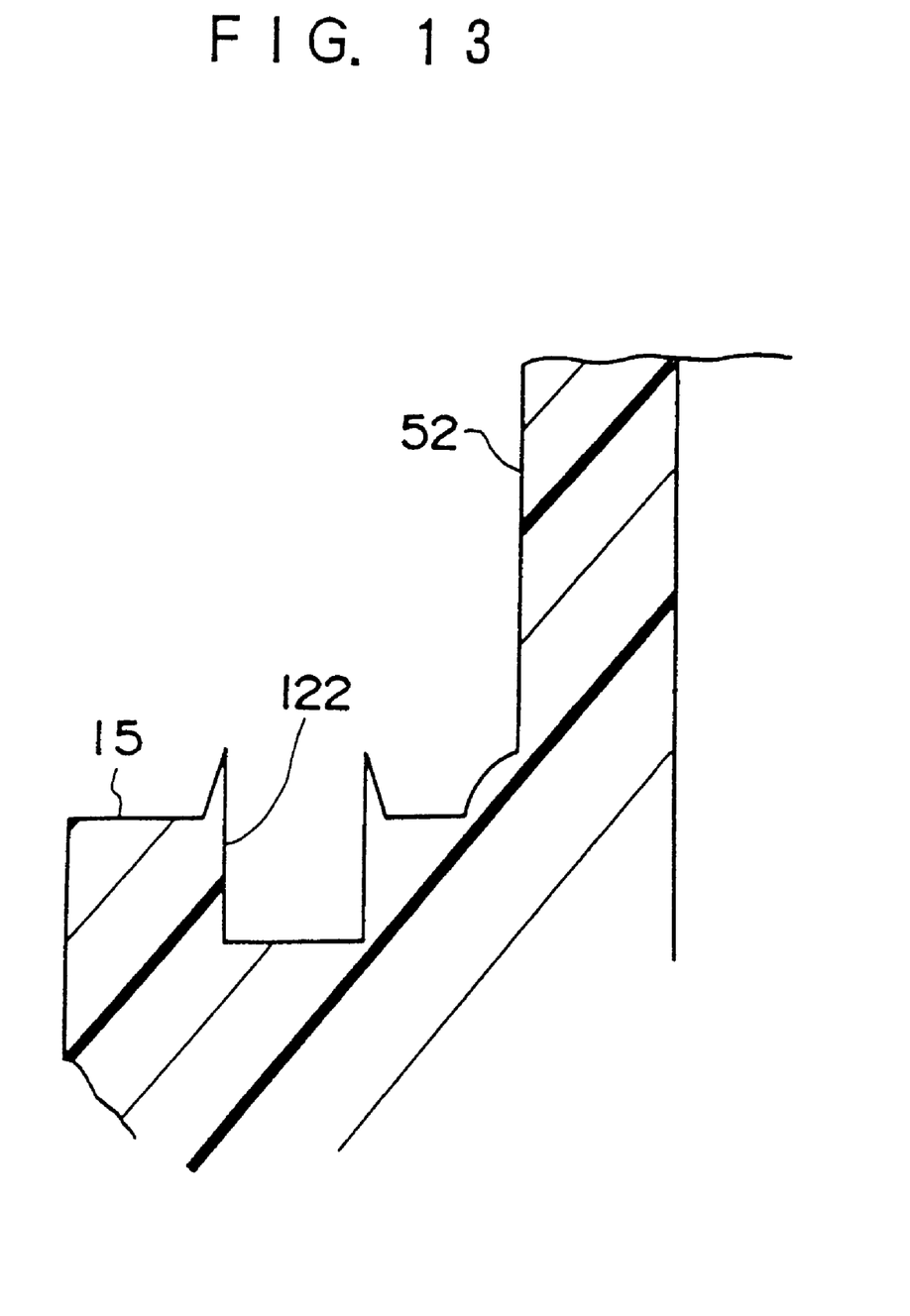
FIG. 13 is a cross sectional view of a variant example of a vent groove (vent hole) of the washer pump according to the third embodiment of the present invention.

Further, the cross sectional configuration of the vent groove 114 or the vent groove 120 which is formed at the flange portion 15 is not limited to a mere concave shape. For example, a vent groove 122, which is shown in FIG. 13 and has a cross sectional configuration in which each of the tip end corner portions of the vent groove 122 protrudes in an acute angle, may be formed. In this case, in a state in which the washer pump 110 is mounted to the washer tank 56 via a grommet, the sealability in the vent hole 112 or 118 which is formed between the flange portion 15 and the grommet is improved even more.

Figure 14:
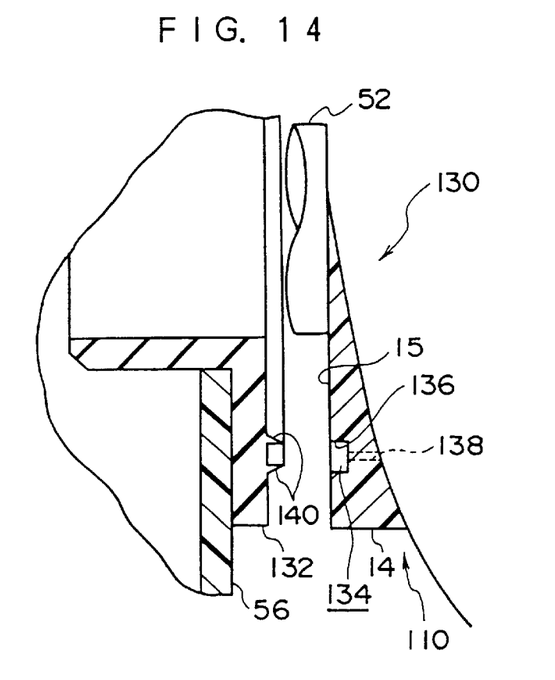
FIG. 14 is a cross sectional view of the structure of a main portion of a washer pump apparatus according to a fourth embodiment of the present invention.

In FIG. 14, the structure of a main portion of a washer pump apparatus 130 according to a fourth embodiment of the present invention is shown.

The washer pump apparatus 130 is basically structured in the same manner as the washer pump apparatus having the washer pump 110 according to the third embodiment of the present invention. The inlet 52 which is formed at the housing 14 is mounted to the washer tank 56 via a grommet 132.

A vent groove 136 for forming a vent hole 134 is formed in the flange portion 15 at the periphery of the inlet 52. The vent groove 136 communicates with a breathing hole 138 which is provided at the washer pump 110.

A protruding portion 140 is formed so as to face the vent groove 136 at the facing portion of the grommet 132, which facing portion faces the flange portion 15 at the periphery of the inlet 52. The protruding portion 140 is fit into the vent groove 136 in the state in which the washer pump 110 is fixed to the washer tank 56 via the grommet 132. Accordingly, the vent hole 134 which communicates with the breathing hole 138 is formed between the flange portion 15 (the vent groove 136) of the washer pump 110 and the grommet 132, and the sealability is improved.

In the washer pump apparatus 130 having the above-described structure, the vent hole 134 is formed between the flange portion 15 of the washer pump 110 and the grommet 132. Therefore, the inside of the washer pump 110 is open to the atmosphere via the vent hole 134 and the breathing hole 138. Accordingly, even when the atmospheric temperature changes due to heat generated by the washer pump 110 itself, the internal pressure is the same as the atmospheric pressure, and water or dust can be prevented from being sucked in through fine gaps or the like of the washer pump 110.

Because of the simple structure of merely forming the vent hole 134 in the surface of the flange portion 15 which surface faces the grommet 132, manufacture is easy and inexpensive. Another part such as a waterproofing cover, a breather pipe or the like is not needed so that the number of parts used does not increase. Further, the number of processes for the assembly work is thereby reduced.

Figure 15:
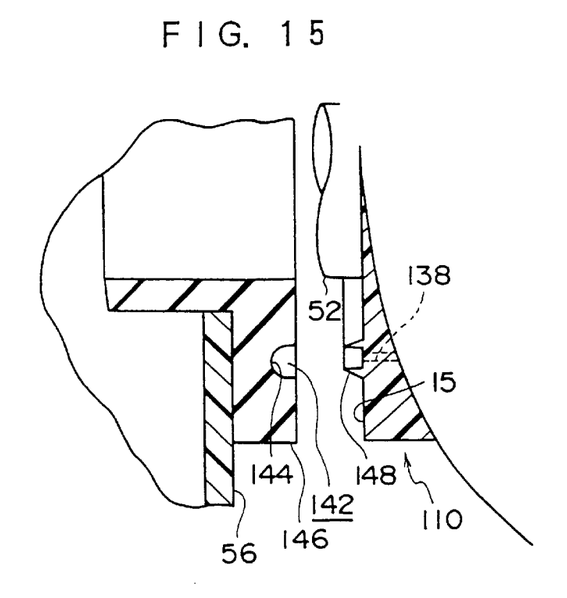
FIG. 15 is a cross sectional view corresponding to FIG. 14, and illustrates a variant example of the washer pump apparatus according to the fourth embodiment of the present invention.

In the fourth embodiment of the present invention, the vent hole 134 (i.e., the vent groove 136 for forming this vent hole 134) is formed at the flange portion 15 at the periphery of the inlet 52, and the protruding portion 140 corresponding to the vent hole 134 is formed at the grommet 132. However, the present invention is not limited to the same. A vent hole 142 which is shown in FIG. 15 (i.e., a vent groove 144 for forming the vent hole 142) may be formed in a grommet 146, and a protruding portion 148 corresponding to the vent hole 142 may be formed at the flange portion 15.

Figure 16A:
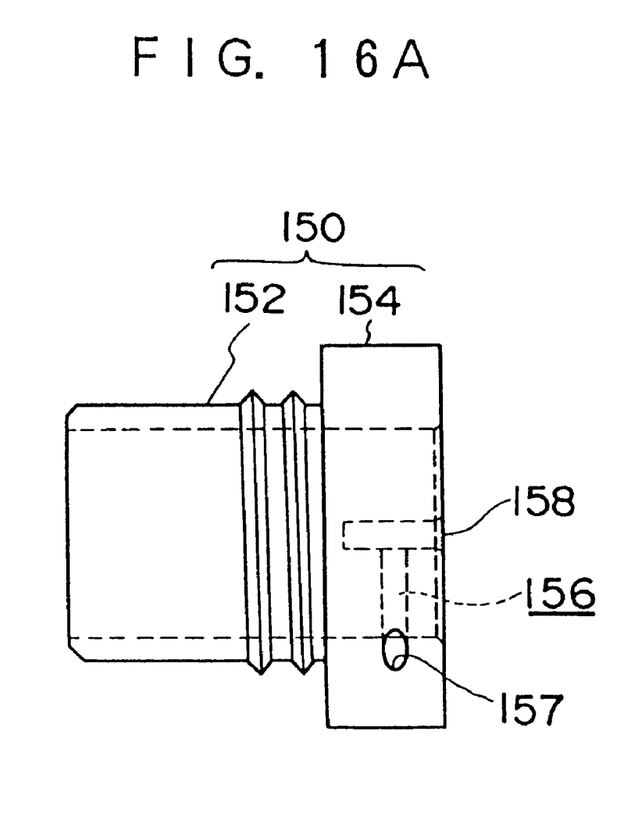
FIG. 16A is a front view of a grommet according to a fifth embodiment of the present invention.
Figure 16B:
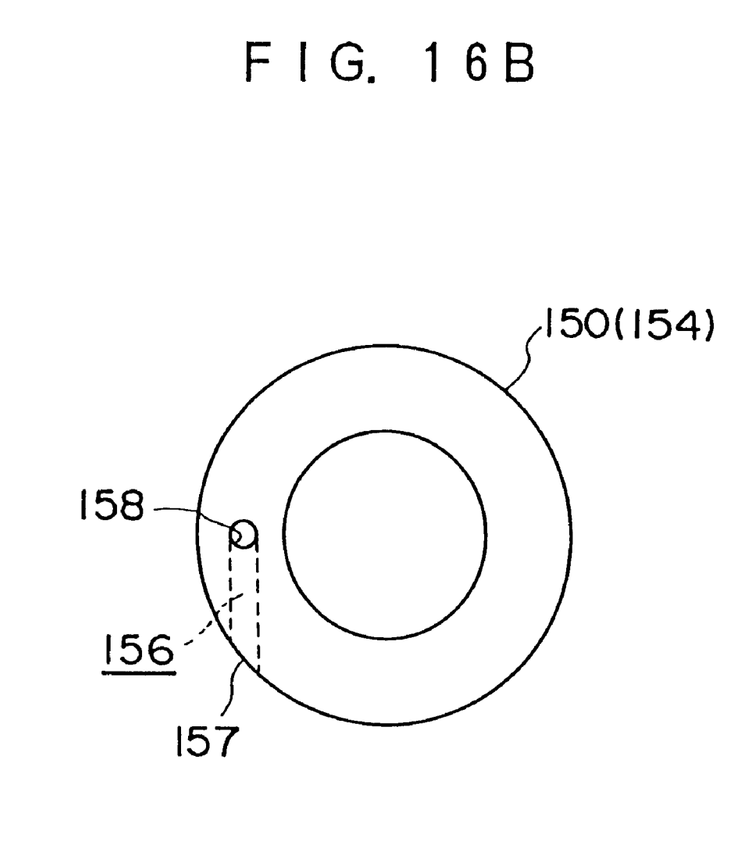
FIG. 16B is a side view of the grommet according to the fifth embodiment of the present invention.

A grommet 150 according to a fifth embodiment of the present invention is shown in FIGS. 16A and 16B.

This grommet 150 is basically formed in the same configuration as the grommet 60 according to the first embodiment of the present invention, and comprises a cylindrical insert portion 152 and a collar portion 154 which is formed integrally with the insert portion 152 at one end thereof. The insert portion 152 is thereby fit into the mounting hole 58.

Further, a vent hole 156 is formed in the collar portion 154 of the grommet 150. One end of the vent hole 156 serves as a joining opening 158 which is open to the opposite side of the washer tank 56. Further, in the first embodiment of the present invention, the vent groove 70 is formed at the collar portion 64 so as to be continuous with the joining opening 68. However, in the grommet 150, the vent hole 156 is formed at the inside of the collar portion 154 so as to be continuous with the joining opening 158. Further, the other end of the vent hole 156 is open at a side of the collar portion 154 and forms an opening 157. In other words, in the grommet 150, the vent hole 156 is formed at the grommet 150 itself, independently of the washer tank 56 or the housing 14.

Accordingly, as described above, in a state in which the washer pump 12 or the like is mounted to the washer tank 56, by using this grommet 150, the interior of the motor portion 12A is open to the atmosphere via the vent hole 156. For this reason, the difference in pressures between the inside and the outside of the washer pump 12 can be eliminated, and the entry of water or dust can be prevented. Further, manufacture is easy and lowcost, and the number of parts used does not increase.

Figure 17A:
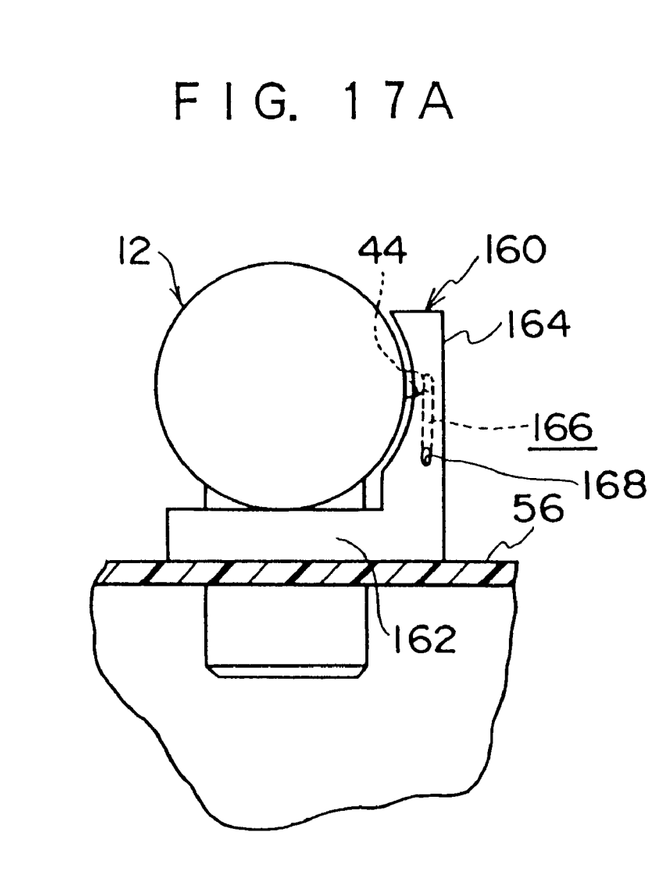
FIG. 17A is a front view of a variant example of the grommet according to the fifth embodiment of the present invention.
Figure 17B:
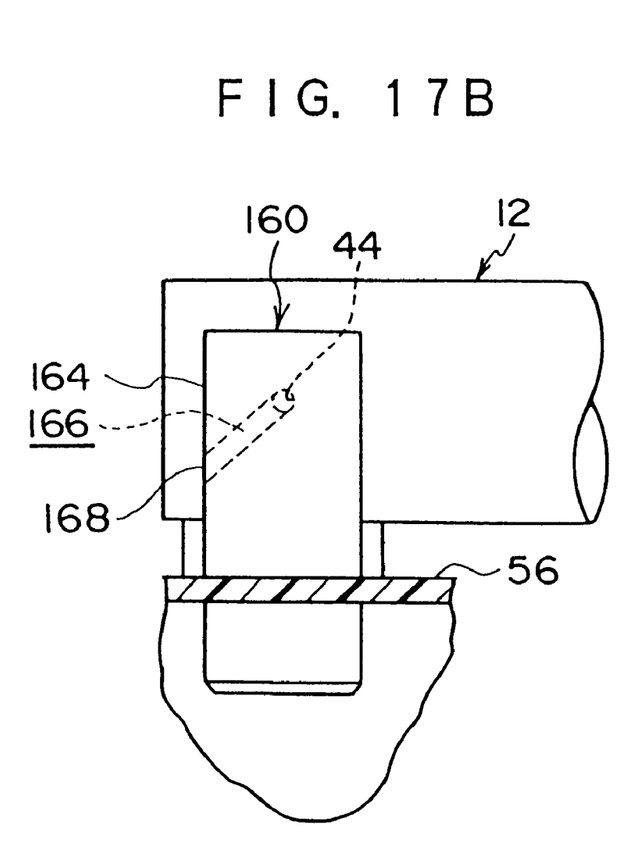
FIG. 17B is a side view of the variant example of the grommet according to the fifth embodiment of the present invention.

In the above-described grommet 150, the collar portion 154 is formed at one end of the cylindrical insert portion 152, and the vent hole 156 is formed at the collar portion 154. However, the present invention is not limited to the same. For example, a structure such as that of a grommet 160 which is shown in FIGS. 17A and 17B, can be used in which an extension portion 164 is formed from a collar portion 162 toward a side of the washer pump 12, and a vent hole 166 and an opening 168 are formed at the extension portion 164. In other words, the collar portion 162 and the vent hole 166 can be formed appropriately in accordance with a position at which the breathing hole 44 of the washer pump 12 is formed.

What is claimed is:

1. A washer pump apparatus having a washer pump which comprises a motor portion and a pump portion which is driven by the motor portion, the washer pump being mounted to a tank via a grommet, wherein the washer pump includes a vent hole which is formed in a state in which the washer pump is fixed to the tank and which communicates with a breathing hole of the motor portion, and an interior of the motor portion is open to the atmosphere via the breathing hole and the vent hole.

2. A washer pump apparatus according to claim 1, wherein an opening of the vent hole, which opening is open to the atmosphere, is formed between the grommet and the tank.

3. A washer pump apparatus according to claim 2, wherein the vent hole has an arc shaped path portion.

4. A washer pump apparatus according to claim 2, wherein the vent hole comprises an arc shaped path portion and a perpendicular path portion which communicates with the arc shaped path portion substantially perpendicularly.

5. A washer pump apparatus according to claim 1, wherein an opening of the vent hole, which opening is open to the atmosphere, is formed between the grommet and a case flange of the washer pump.

6. A washer pump apparatus according to claim 5, wherein the vent hole has an arc shaped path portion.

7. A washer pump apparatus according to claim 5, wherein the vent hole comprises an arc shaped path portion and a perpendicular path portion which communicates with the arc shaped path portion substantially perpendicularly.

8. A washer pump apparatus according to claim 1, wherein an opening of the vent hole, which opening is open to the atmosphere, is formed at the grommet.

9. A washer pump apparatus according to claim 8, wherein the vent hole is formed at an annular portion of the grommet.

10. A washer pump apparatus according to claim 1, wherein a groove portion, which is formed at the grommet, and a portion of the tank are fixed to each other, and the vent hole is thereby formed between the grommet and the tank.

11. A washer pump apparatus according to claim 1, wherein the vent hole is formed in a labyrinthine shape.

12. A washer pump apparatus according to claim 1, wherein at least one valve body is formed at the vent hole.

13. A washer pump apparatus according to claim 10, wherein the groove portion is formed between a pair of pleat portions which are formed at the grommet so that the groove portion and the portion of the tank closely contact one another, and sealability of the vent hole is enhanced.

14. A washer pump apparatus according to claim 1, wherein a groove portion, which is formed at a case flange of the washer pump, and the grommet are fixed to each other, and the vent hole is thereby formed between the grommet and the tank.

15. A washer pump apparatus according to claim 14, wherein a pair of protruding piece portions are formed substantially at both sides of the groove portion so that the groove portion and the grommet closely contact one another, and the sealability of the vent hole is enhanced.

16. A washer pump according to claim 10, further comprising:

a protruding portion which is formed at the grommet, wherein in a state in which the washer pump is fixed to the tank, the protruding portion is fit into the groove portion.

17. A washer pump apparatus according to claim 1, further comprising:

a protruding portion which is formed at a case flange of the washer pump; and a groove portion which is formed at the grommet, wherein in a state in which the washer pump is fixed to the tank, the protruding portion is fit into the groove portion and the vent hole is formed.

18. A washer pump apparatus having a washer pump which comprises a motor portion and a pump portion driven by the motor portion, the washer pump being mounted to a tank via a grommet, wherein a vent hole which communicates with a breathing hole of the motor portion is formed in the grommet, and an interior of the motor portion is open to the atmosphere via the breathing hole and the vent hole.

* * * * *